(12) United States Patent  (10) Patent No.: US 8,599,660 B2
Morimoto et al.  (45) Date of Patent: Dec. 3, 2013

(54) OBJECTIVE LENS DRIVING DEVICE AND OPTICAL PICKUP APPARATUS INCLUDING THE SAME

(71) Applicants: Shunichi Morimoto, Ota (JP); Shingo Matsuzaki, Ora-gun (JP)

(72) Inventors: Shunichi Morimoto, Ota (JP); Shingo Matsuzaki, Ora-gun (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 13/626,594

(22) Filed: Sep. 25, 2012

(65) Prior Publication Data

US 2013/0077455 A1 Mar. 28, 2013

(30) Foreign Application Priority Data

Sep. 26, 2011 (JP) ................................ 2011-208758

(51) Int. Cl.
*G11B 7/00* (2006.01)
(52) U.S. Cl.
USPC ...................................... 369/44.16; 720/683
(58) Field of Classification Search
None
See application file for complete search history.

(56) References Cited

U.S. PATENT DOCUMENTS

| 5,408,451 | A | * | 4/1995 | Noda et al. | 369/44.15 |
| 5,617,256 | A | * | 4/1997 | Mitsumori et al. | 359/814 |
| 5,870,371 | A | * | 2/1999 | Tsuchiya et al. | 369/112.24 |
| 6,377,521 | B1 | * | 4/2002 | Kijima et al. | 369/44.23 |
| 6,741,543 | B1 | * | 5/2004 | Suzuki et al. | 720/683 |
| 7,194,748 | B2 | * | 3/2007 | Ikeda et al. | 720/683 |
| 2003/0007430 | A1 | * | 1/2003 | Ikeda et al. | 369/44.18 |
| 2003/0198148 | A1 | * | 10/2003 | Choi | 369/44.16 |
| 2004/0022168 | A1 | * | 2/2004 | Kawano et al. | 369/244 |
| 2004/0103420 | A1 | * | 5/2004 | Kimura et al. | 720/683 |
| 2005/0141360 | A1 | * | 6/2005 | Han | 369/44.15 |
| 2013/0019255 | A1 | * | 1/2013 | Morimoto et al. | 720/681 |
| 2013/0077455 | A1 | * | 3/2013 | Morimoto et al. | 369/44.16 |

FOREIGN PATENT DOCUMENTS

JP 2005-302161 10/2005

* cited by examiner

*Primary Examiner* — Peter Vincent Agustin
(74) *Attorney, Agent, or Firm* — Morrison & Foerster LLP

(57) ABSTRACT

Provided are an objective lens driving device capable of strengthening the effective magnetic fluxes of the magnets while preventing increases in size and costs of the device; and an optical pickup apparatus including the same. The objective lens driving device of the invention includes an actuator frame for movably supporting an OBL holder. Four tracking coils are attached to sidewalls of the OBL holder, and four magnets are attached to the back yokes of the actuator frame to be opposed to the tracking coils, respectively. In addition, two of the tracking coils are placed tilting to one of the sidewalls of the OBL holder.

5 Claims, 7 Drawing Sheets

OBJECTIVE LENS DRIVING DEVICE AND OPTICAL PICKUP APPARATUS INCLUDING THE SAME

This application claims priority from Japanese Patent Application Number JP 2011-208758 filed on Sep. 26, 2011, the contents of which are incorporated herein by reference in its entirety.

BACKGROUND OF THE INVENTION

1. Field of the Invention

The invention relates to an objective lens driving device and an optical pickup apparatus including the same. Particularly, the invention relates to: an objective lens driving device including a constitution for strengthening effective magnetic fluxes of magnets included in an actuator frame; and an optical pickup apparatus including the same.

2. Description of the Related Art

In an objective lens driving device in an optical head for optically reading or writing a signal from or to an optical disc, an objective lens holder (hereinafter referred to as an "OBL holder") to which an objective lens is attached is supported to be movable relative to an actuator frame. In addition, a focus coil and tracking coils, as well as tilt coils depending on the necessity, are mounted on the OBL holder; the effective areas of these driving coils are placed within predetermined magnetic fields formed by magnetic circuits; and thereby, the objective lens is driven in accordance with signals supplied to the driving coils.

The structure of an existing objective lens driving device is shown, for example, in Japanese Patent Application Publication No. 2005-302161 (JP2005-302161A). Referring to FIG. 3 of this document, a focusing coil 25 and tracking coils 26 are housed in a coil holder 24 shaped almost like a rectangular frame. In addition, an objective lens driving device 8 including the coil holder 24 is driven in a predetermined direction by the magnetic actions of the focusing coil 25 and the tracking coils 26. Furthermore, referring to FIG. 2 of JP2005-302161A, back yokes 28 are placed on the back side of tilt magnets 29, respectively.

SUMMARY OF THE INVENTION

Although JP2005-302161A strengthens the effective magnetic fluxes of the tilt magnets 29 by providing the back yokes 28 respectively, this effect needs to be further enhanced for the purpose of size reduction and cost cutting of the optical pickup.

To this end, many yokes made from magnetic material could be placed around the magnets. However, such placement may make the size of the objective lens driving device larger.

The invention has been made with the foregoing problem taken into consideration. An object of the invention is to provide an objective lens driving device capable of strengthening the effective magnetic fluxes of magnets while preventing an increase in the overall size and other unfavorable things of the device; and an optical pickup apparatus including the objective lens driving device.

An objective lens driving device of a first aspect of the invention includes: an objective lens holder for holding an objective lens; a first tracking coil and a second tracking coil placed on an outer side of a first sidewall portion of the objective lens holder; a third tracking coil and a fourth tracking coil placed on an outer side of a second sidewall portion of the objective lens holder opposed to the first sidewall portion; an actuator frame for movably supporting the objective lens holder; and a first magnet, a second magnet, a third magnet and a fourth magnet fixed to the actuator frame in order to produce effective magnetic fluxes over effective areas of the first tracking coil, the second tracking coil, the third tracking coil and the fourth tracking coil, respectively. In the device, the first tracking coil and the second tracking coil are formed by winding a conducting wire while tilting the wound conducting wire to the first sidewall portion.

An objective lens driving device of a second aspect of the invention includes: an objective lens holder for holding an objective lens; a first tracking coil and a second tracking coil placed on an outer side of a first sidewall portion of the objective lens holder; a third tracking coil and a fourth tracking coil placed on an outer side of a second sidewall portion of the objective lens holder opposed to the first sidewall portion; an actuator frame for movably supporting the objective lens holder; and a first magnet, a second magnet, a third magnet and a fourth magnet fixed to the actuator frame in order to produce effective magnetic fluxes over effective areas of the first tracking coil, the second tracking coil, the third tracking coil and the fourth tracking coil, respectively. In the device, the first magnet and the second magnet are fixed to a first back yoke which is formed by bending a part of the actuator frame, the third magnet and the fourth magnet are fixed to a second back yoke which is formed by bending another part of the actuator frame, and sub-yokes formed by further bending two end portions of the second back yoke are placed to produce effective magnetic fluxes over the effective areas of the third tracking coil and the fourth tracking coil, respectively.

An optical pickup apparatus of the invention includes the objective lens driving device of the above structure which is installed in a housing.

BRIEF DESCRIPTION OF THE DRAWINGS

FIG. 3A is a plan view showing an OBL holder section in a magnified manner; and FIG. 3B is a perspective view showing an actuator frame.

FIG. 4A is a side view showing the objective lens driving device; and FIG. 4B is a plan view showing the objective lens driving device.

FIG. 5A is a perspective view showing the objective lens holder in which various coils and the like are installed; FIG. 5B is a perspective view showing the objective lens holder in which no coils have been installed yet.

FIG. 6A is a perspective view showing the objective lens holder in which the various coils and the like are installed; FIG. 6B is a plan view of the objective lens holder; and FIG. 6C is a plan view showing part of the objective lens holder in a magnified manner.

FIG. 7A is a perspective view showing a step of supplying an adhesive via a bobbin; and FIG. 7B is a cross-sectional view showing how the step is carried out in detail.

DETAILED DESCRIPTION OF THE INVENTION

Figure 1:
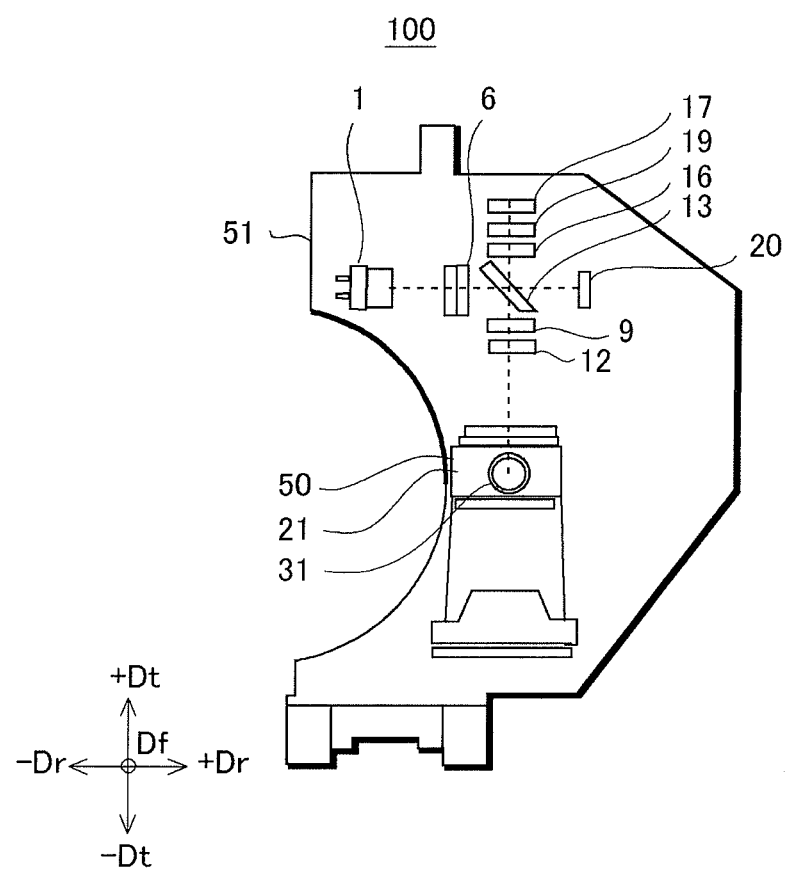
FIG. 1 is a plan view showing an optical pickup apparatus of a preferred embodiment of the invention.

A preferred embodiment of the invention will be described by referring to FIG. 1 to FIG. 7B. First of all, FIG. 1 is a plan view schematically showing an optical pickup apparatus 100 of the embodiment.

The optical pickup apparatus 100 supports optical discs in compliance with, for example, the CD (Compact Disc) standard, the DVD (Digital Versatile Disc) standard and the BD (Blu-ray Disc) standard. The optical pickup apparatus 100 is made up by arranging an objective lens driving device 50 and various optical parts in a housing 51. A general function of the optical pickup apparatus is to read or write information from or to an optical disc by: irradiating an information recording layer of the optical disc with a laser beam in compliance with a predetermined standard; and receiving the laser beam reflected off this information recording layer.

The objective lens driving device 50 movably holds an objective lens holder (hereinafter referred to as an "OBL holder") 21. An objective lens 31, which supports any one or all of the standards, is attached to the OBL holder 21.

A laser unit 1 includes a laser diode. A laser beam in compliance with any one of the above-mentioned standards is emitted from this laser diode. To put it specifically, a laser beam with a bluish-violet (blue) wavelength range of 395 nm to 420 nm (for example, a wavelength of 405 nm) suitable for the BD, a laser beam with a red wavelength range of 645 nm to 675 nm (for example, a wavelength of 650 nm) suitable for the DVD, or a laser beam with an infrared wavelength range of 765 nm to 805 nm (for example, a wavelength of 780 nm) suitable for the CD is emitted from the laser diode.

The laser beam emitted from the laser unit 1 is separated into the zero-order beam, the plus first-order beam and the minus first-order beam by a diffraction grating 6, and is subsequently reflected by a semitransparent mirror 13. Thereafter, the resultant laser beam passes through a quarter-wavelength plate 9 and a collimator lens 12, as well as is reflected by a reflecting mirror, which is not illustrated. Afterward, the laser beam is focused on the information recording layer of the optical disc by the objective lens 31. Part of the laser beam emitted from the laser unit 1 is detected by a FMD 20 after passing through the semitransparent mirror 13. On the basis of this detection, the output of the laser unit 1 is adjusted.

The laser beam, as a return beam reflected off the information recording layer of the optical disc, passes through the reflecting mirror, the collimator lens 12, the quarter-wavelength plate 9 and the semitransparent mirror 13. Thereafter, an unnecessary astigmatism is removed from, and a desired astigmatism is added to, the laser beam by a first plate 16 and a second plate 19. Subsequently, the resultant laser beam is detected by an optical detector (PDIC) 17. On the basis of a signal detected by the optical detector 17, a control signal is supplied to a coil of the OBL holder 21, and a control current is supplied to focus coils, tracking coils or a tilt coil. As a result of this, a focus control, a tracking control and a radial tilt control are carried out. In this respect, the tilt coil is omitted from the objective lens driving device 50, which will be described later, because the focus coils each perform a function of a tilt coil combinedly.

A Dt direction, a Dr direction and a Df direction shown in FIG. 1 mean a tangential direction, a tracking direction (a radial direction of the optical disc) and a focus direction, respectively. These directions are orthogonal to one another.

Descriptions will be provided for the objective lens driving device 50 installed in the optical pickup apparatus which have been described above.

The objective lens driving device 50 includes an actuator movable unit 40 and an actuator frame 41. The actuator movable unit 40 includes the OBL holder 21 and support wires 45. The actuator frame 41 is made from a magnetic metal material such as a silicon steel plate. Various yokes, which will be described later, are formed by bending parts of the actuator frame 41 at a right angle.

The actuator movable unit 40 is elastically supported by the support wires 45 to be movable in the focus direction (the Df direction), the tracking direction (the Dr direction) and a radial tilt direction (a Drt direction) with respect to the actuator frame 41. One end of each support wire 45 is fixed to a sidewall of the OBL holder 21, and the other end of the support wire 45 is fixed to a fixture board 44 which is fixed to the actuator frame 41. The fixture board 44 is bonded to an auxiliary member 43 in which a damper material is filled for reducing vibration of the support wires 45. The fixture board 44, together with the auxiliary member 43, is screwed to the actuator frame 41. The support wires 45 mechanically support the actuator movable unit 40 in the air while three support wires 45, for example, are laid over each side surface of the actuator frame 41. In addition, the support wires 45 function as connector means through which electricity flows to the coils included in the actuator movable unit 40.

Figure 2:
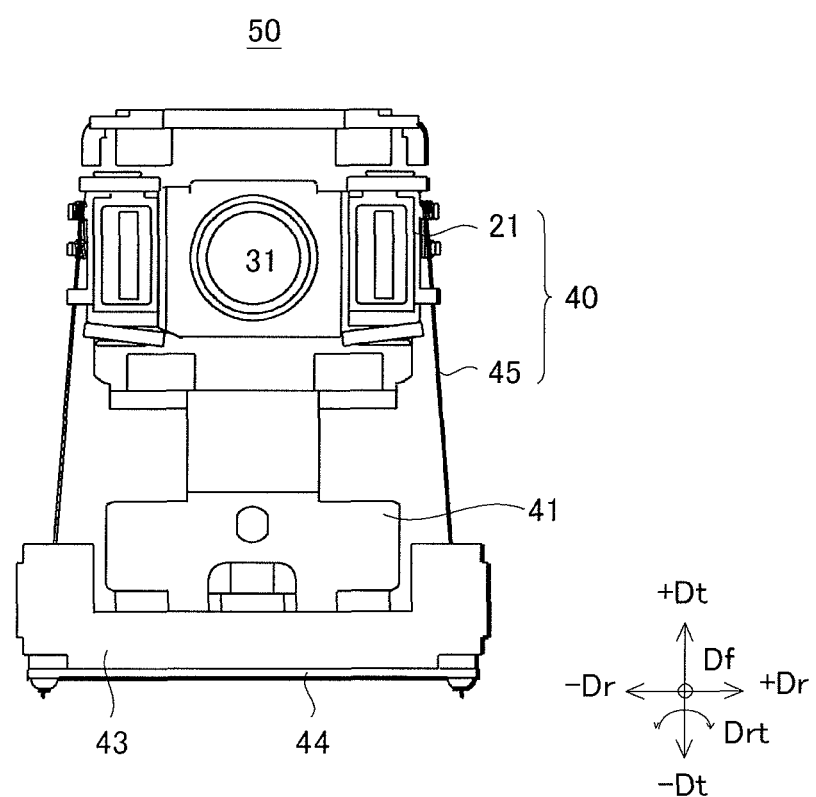
FIG. 2 is a plan view showing an objective lens driving device of the preferred embodiment of the invention.
Figure 3A:
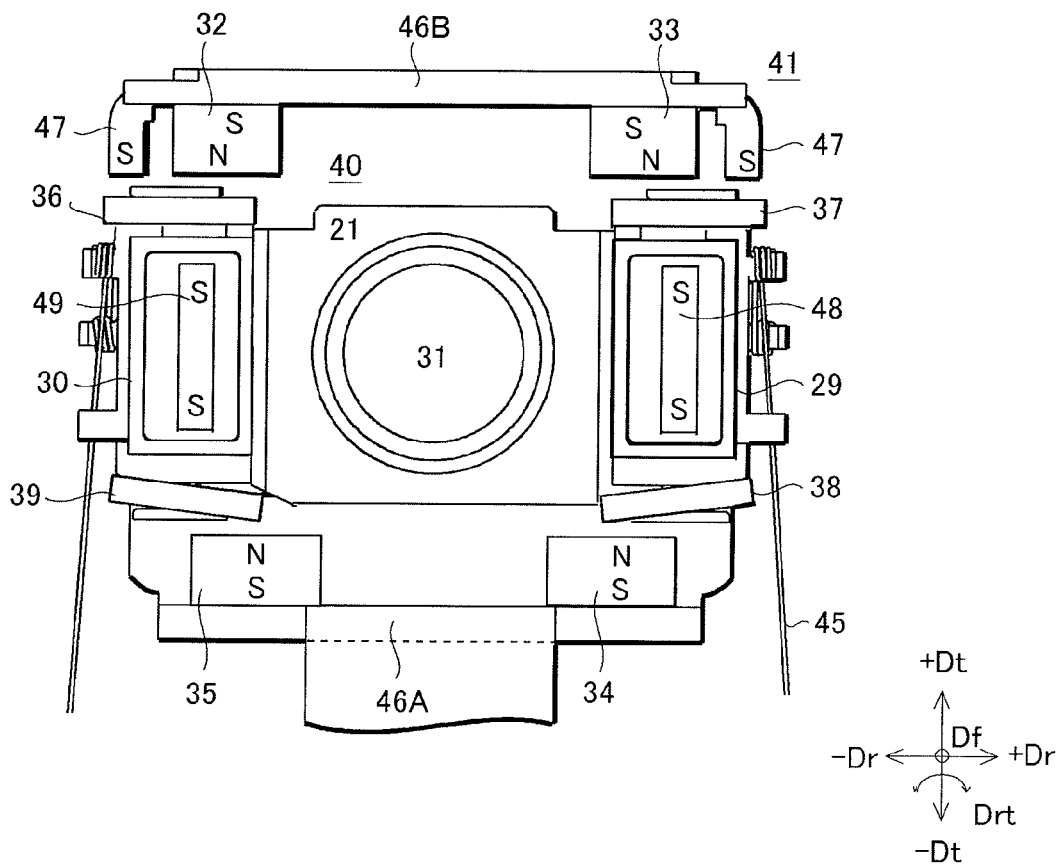
FIGS. 3A and 3B are diagrams showing the objective lens driving device of the preferred embodiment of the invention.
Figure 3B:
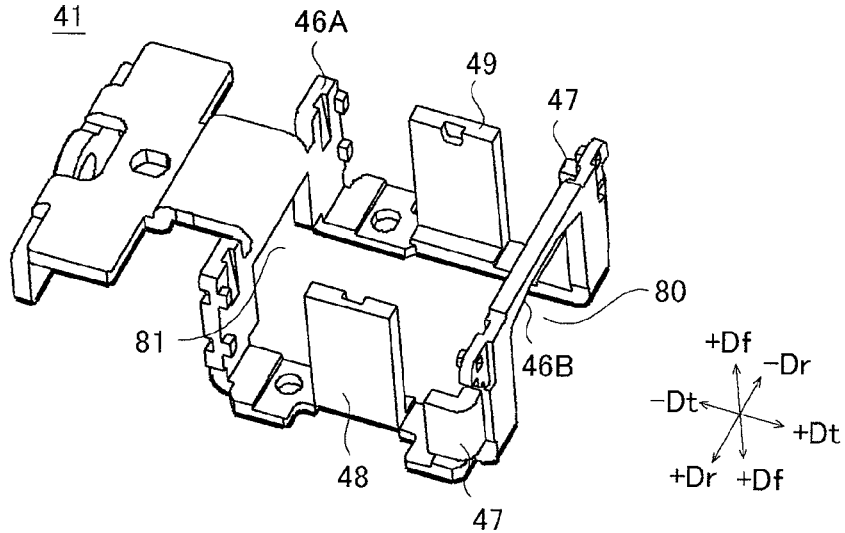

Referring to FIGS. 3A and 3B, descriptions will be provided for the constitution of the actuator movable unit 40 installed in the objective lens driving device 50 shown in FIG. 2. FIG. 3A is a diagram partially showing the actuator movable unit 40 and the actuator frame 41, and FIG. 3B is a perspective view showing the actuator frame 41 alone.

Referring to FIG. 3A, the actuator movable unit mainly includes: the OBL holder 21; the objective lens 31 fixed to the upper surface of the OBL holder 21; tracking coils 36 to 39 wound around the respective outer surfaces of sidewall portions of the OBL holder 21; and focus coils 29, 30 built in the OBL holder 21.

Magnets 32 to 35 are placed on back yokes of the actuator frame 41 which face the tracking coils 36 to 39 placed in the outer sides of the sidewall portions of the OBL holder 21. To put it specifically, the tracking coil 39 and the tracking coil 38 are provided to sidewall portions which are lower ones of the OBL holder 21 in FIG. 3A; the magnet 35 is placed opposite to the tracking coil 39; and the magnet 34 is placed opposite to the tracking coil 38. On the other hand, the tracking coil 36 and the tracking coil 37 are provided to sidewall portions which are upper ones of the OBL holder 21 in FIG. 3A; the magnet 32 is placed opposite to the tracking coil 36; and the magnet 33 is placed opposite to the tracking coil 37.

The surfaces of the magnets 32 to 35, which are respectively opposite to the tracking coils 36 to 39, have the same polarity (for example, the N pole). The magnets 32 to 35 produce the effective magnetic fluxes over the effective areas of the tracking coils 36 to 39, respectively. Once the electric current is supplied to the tracking coils 36 to 39, this constitution moves the OBL holder 21 in the Dr direction due to the collaboration between the magnetic fields produced by the flow of the electricity through the tracking coils 36 to 39 and the magnetic circuits formed from the magnetic fields generated by the magnets 32 to 35.

The two focus coils 29, 30 each having a winding axis extending in the Df direction are placed in internal areas of the OBL holder 21 which are opposite to each other with the objective lens 31 in between. The magnets 32 to 35 produce the effective magnetic fluxes over the effective areas of the focus coils 29, 30 as well. Accordingly, once the electric current is supplied to the focus coils 29, 30, the OBL holder 21 is moved in the Df direction due to the collaboration between the magnetic fields produced by the flow of the electricity through the focus coils 29, 30 and the magnetic circuits formed from the magnetic fields generated by the magnets 32 to 35. It should be noted that in this embodiment, the OBL holder 21 is controlled in the tilt direction (the Drt direction) by giving a control signal for controlling the OBL holder 21 in the tilt direction to the focus coils 29, 30.

As shown in FIG. 3B, a back yoke 46A is a part formed by bending an end portion of the actuator frame 41 at a right angle. The magnets 35, 34 are fixedly attached to a side surface of the back yoke 46A which faces the OBL holder 21. The effective magnetic fluxes of the magnets 35, 34 can be strengthened by fixedly attaching the magnets 35, 34 to the back yoke 46A which, as described above, is made from the magnetic metal material.

Furthermore, a back yoke 46B is formed by bending another portion of the actuator frame 41 at a right angle. The magnets 32, 33 are fixedly attached to a side surface of the back yoke 46B which faces the OBL holder 21. In addition, sub-yokes 47 are provided by bending the two end portions of the back yoke 46B at a right angle when viewed in the Df direction. Thereby, the magnets 32, 33 are surrounded by the back yoke 46B and the sub-yokes 47. The sub-yokes 47 produce the magnetic fluxes which effectively act on the tracking coils 36, 37, respectively, by making the same magnetic pole (for example, the S pole) of the magnets 32, 33 in close contact with the back yoke 46B. Accordingly, the effective magnetic fluxes of the magnetic circuits formed with the magnets 32, 33 are strengthened.

In this respect, the above-described sub-yokes may be provided to sides of the back yoke 46A holding the magnets 34, 35. This embodiment, however, does not employ such a design. The reason for this is that if the sub-yokes are provided to the sides of the back yoke 46A, the sub-yokes is likely to get into contact with the support wires 45, and accordingly to disrupt the operation of the OBL holder 21 in use.

Like the back yoke 46A and the like, opposed yokes 48, 49 are parts formed by bending portions of the actuator frame at a right angle (see FIG. 3B, for example). The opposed yokes 48, 49 are provided in locations where the opposed yokes 48, 49 are inserted into the focus coils 29, 30, respectively (see FIG. 3A, for example). This placement of the opposed yokes 48, 49 makes it possible to strengthen the effective magnetic fluxes which act on the focus coils 29, 30 and the tracking coils 36 to 39, and is accordingly effective in enhancing the sensitivity of the OBL holder 21 in the Df direction, the Dr direction and the Drt direction.

Referring to FIG. 3A, this embodiment places the tracking coils 38, 39 in a way that makes the tracking coils 38, 39 tilt to the side surface of the OBL holder 21. To put it specifically, the tracking coils 38, 39 are placed tilted in a way that makes the inner portions of the tracking coils 38, 39 closer to the magnets 34, 35 than the outer portions of the tracking coils 38, 39, respectively. This placement reduces the distances between the inner portions of the tracking coils 38, 39 and the magnets 34, 35, respectively. For this reason, the effective magnetic fluxes which act on the tracking coils 38, 39 become stronger. Incidentally, referring to FIG. 6, descriptions will be later provided for a method of winding the tracking coils 38, 39 in the tilting manner.

On the other hand, the tracking coils 36, 37 are not wound in the tilting manner, but are wound in close contact with the side surface of the OBL holder 21 and in parallel to the side surface of the OBL holder 21. The reason for this is that although the tracking coils 36, 37 can be formed in the tilting manner, the tilted formation increases the distances between the tracking coils 36, 37 and the focus coils 29, 30, and thus makes the sensitivity in the focus direction worse.

A cut 80 for securing the optical path of the laser beam for a reflection mirror, which is placed under the OBL holder 21 and configured to guide the laser beam to the objective lens 31, is formed in the back yoke 46B to which the magnets 32, 33 for producing the effective magnetic fluxes for the tracking coils 36, 37 are fixedly attached. This cut 80 is set wider than a cut 81 formed, for the purpose of securing the optical path, in the back yoke 46A to which the magnets 34, 35 are fixedly attached. To this end, used are the paired magnets 32, 33 which are narrower in width than the other paired magnets 34, 35. Because these magnets 32, 33, 34, 35 are made from the same kind of magnet, the magnetic forces produced by the paired magnets 32, 33 is weaker than the magnetic forces produced by the other paired magnets 34, 35 due to the size of each magnet. However, the lowness of the magnetic forces of the magnets 32, 33 due to their smaller size than the magnets 34, 35 is compensated with the effects of the sub-yokes 47, because in the magnetic circuits formed with the magnets 32, 33, the effective magnetic fluxes which act on the tracking coils 36, 37 are increased by forming the sub-yokes 47 for producing the effective magnetic fluxes for the tracking coils 36, 37 in the back yoke 46B.

On the other hand, in the magnetic circuits formed with the magnets 34, 35, the magnetic fluxes which effectively act on the tracking coils 38, 39 are strengthened by: making the paired magnets 34, 35 use magnets which are larger than the other paired magnets 32, 33; and placing the inner portions of the tracking coils 38, 39 closer to the magnets 34, 35 than the outer portions of the tracking coils 38, 39.

Figure 4A:
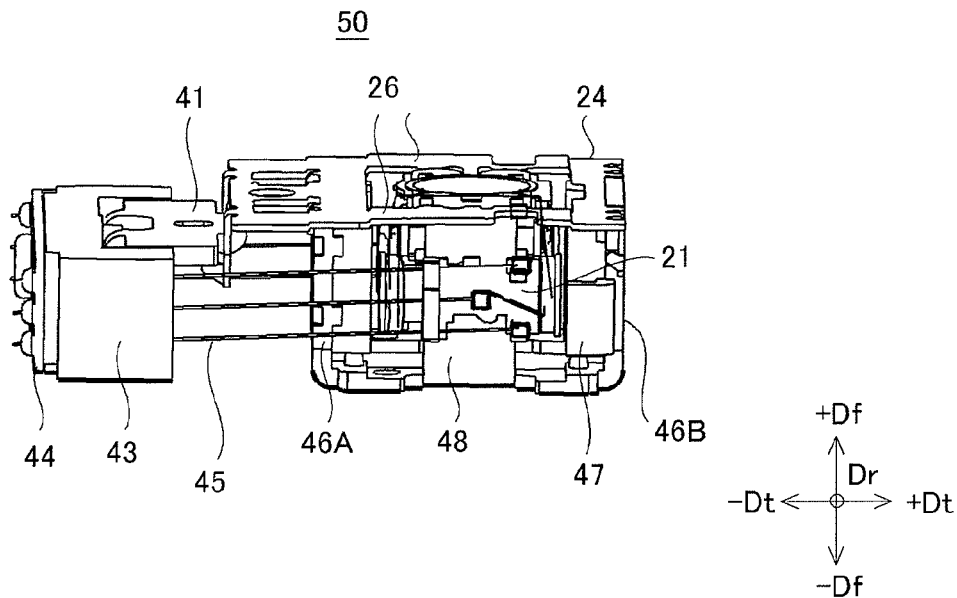
FIGS. 4A and 4B are diagrams showing the objective lens driving device of the preferred embodiment of the invention.
Figure 4B:
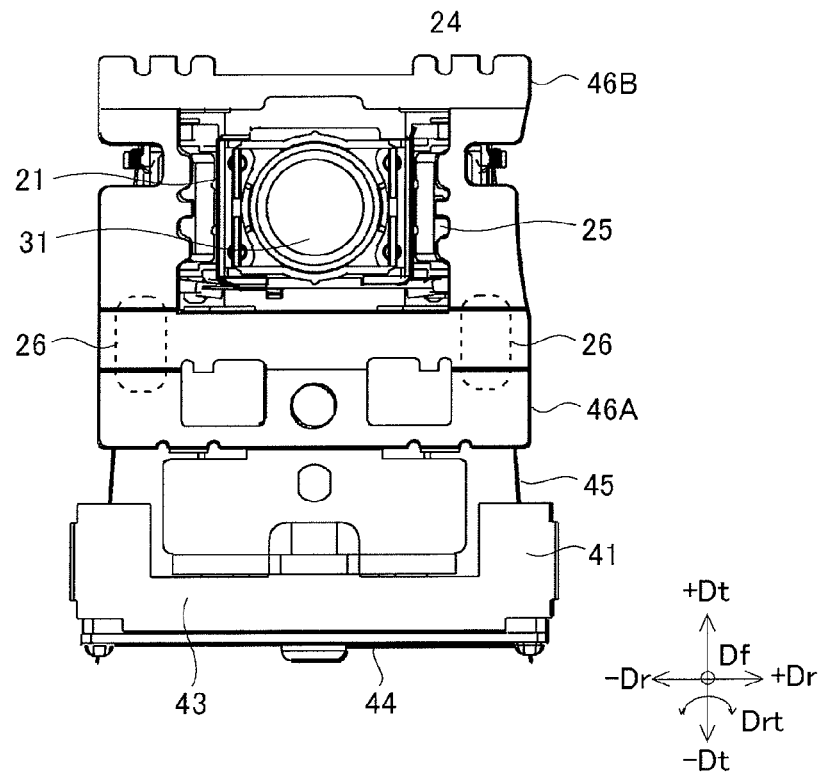

Referring to FIGS. 4A and 4B, descriptions will be provided for a cover 24 which is provided to the objective lens driving device 50. FIG. 4A is a side view showing the objective lens driving device 50 as provided with the cover 24, and FIG. 4B is a plan view showing the objective lens driving device 50 which is looked at from above.

Referring to FIG. 4A, the cover 24 is made from the magnetic metal material like the actuator frame 41, and is fixedly attached to the upper surface of the actuator frame 41 to cover the yokes and the OBL holder 21.

Referring to FIG. 4B, the outer shape of the cover 24 in the plan view is large enough to cover the yokes (the back yokes 46A, 46B and the opposed yokes 48, 49 shown in FIG. 4A) and the OBL holder 21. In addition, an opening 25 is opened in and around the center of the cover 24. The objective lens 31 is exposed to the outside through this opening 25. Because the cover 24 is provided with multiple other openings, the cover 24 as a whole is shaped like a frame.

Portions of the cover 24, which cover areas extending from the back yoke 46A to the opposed yokes 48, 49 are made wider than the rest of the cover 24, and form coverage parts 26. Referring to FIG. 4A, the back yoke 46A is magnetically connected to the opposed yokes 48, 49 by these coverage parts 26, respectively. Referring to FIG. 3A, this strengthens the effective magnetic fluxes of the magnets 34, 35 to act on the tracking coils 38, 39 and the focus coils 29, 30. On the other hand, portions of the cover 24 covering the back yoke 46B, which is the upper one in FIG. 4B, are provided with no wider portions unlike the coverage parts 26. In other words, the cover 24 is narrower in the portions covering the back yoke 46B than in the portions covering the back yoke 46A. In this respect, the coverage parts 26 may be wider or thicker than the portions of the cover 24 which cover the back yoke 46B. Otherwise, the coverage parts 26 may be both wider and thicker than the portions of the cover 24 which cover the back yoke 46B. This brings about the same effects.

As described above, the back yoke 46A is provided with no sub-yokes, but the wide coverage parts 26 are provided to the cover 24. Thereby, it is possible to strengthen the effective fluxes of the magnets which are fixedly attached to the back yoke 46A.

Figure 5A:
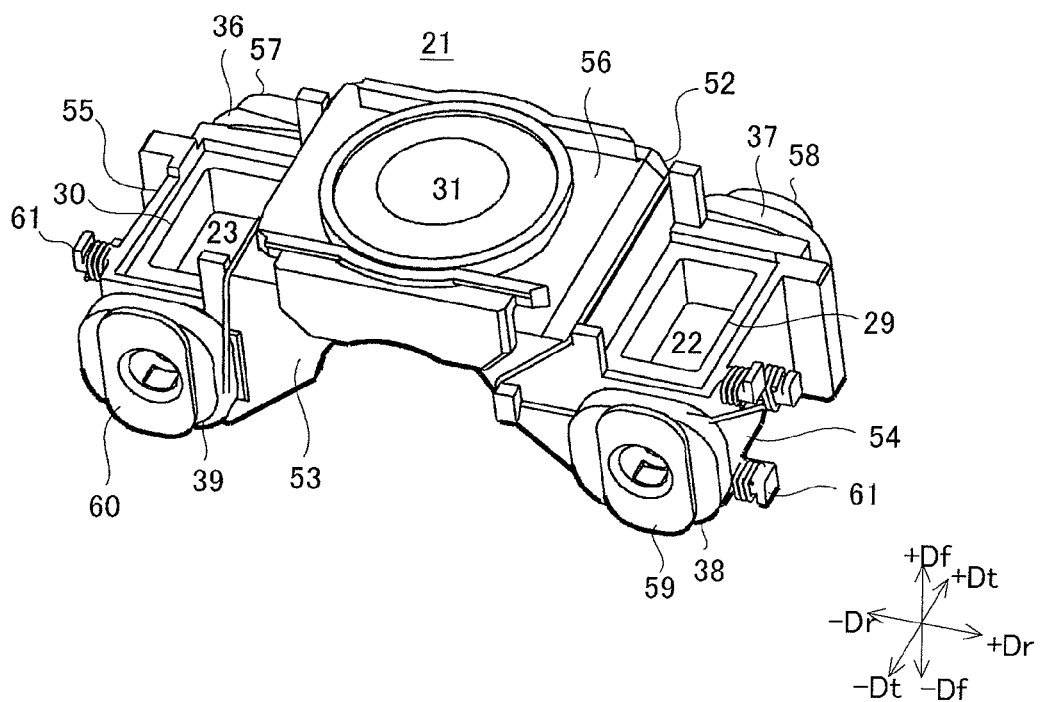
FIGS. 5A and 5B are diagrams showing an objective lens holder of the preferred embodiment of the invention.
Figure 5B:
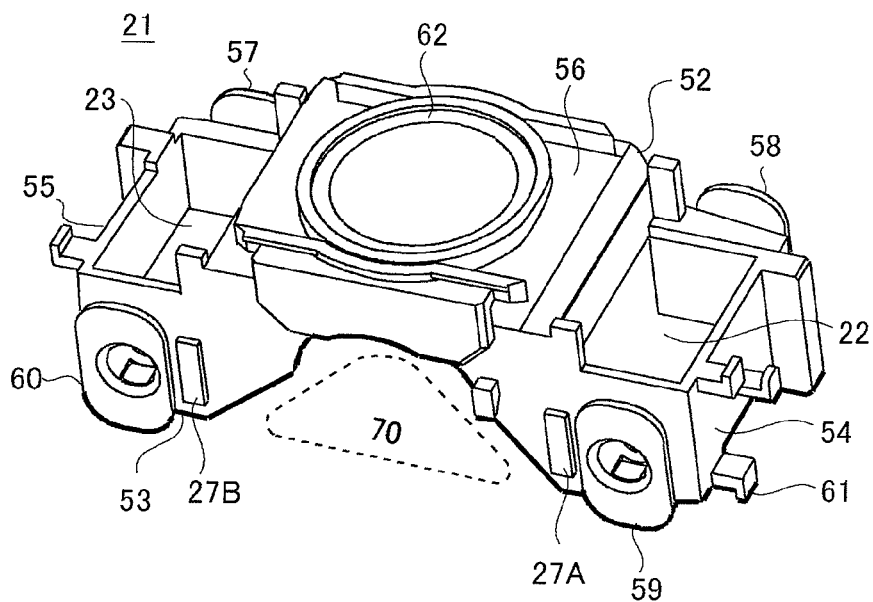

Referring to FIGS. 5A and 5B, descriptions will be provided for the constitution of the OBL holder 21 included in the actuator movable unit. FIG. 5A is a perspective view of the OBL holder 21 as provided with the coils. FIG. 5B is a perspective view showing the OBL holder 21 alone.

The OBL holder 21 is generally shaped like a housing having an opening in its lower portion. To put it specifically, the OBL holder 21 includes: a principal surface portion 56 provided with a circular opening to which the objective lens 31 is attached; and four sidewall portions integrally continuing downwards from the periphery of the principal surface portion 56. The sidewall portions include: a first sidewall portion 52, in the backside of the drawing, extending in the long-side direction; a second sidewall portion 53, in the front side of the drawing, opposed to the first sidewall portion 52; a third sidewall portion 54 provided in the right side of the drawing, and extending in the short-side direction; and a fourth sidewall portion 55 provided in the left end portion of the drawing. The principal surfaces of the first sidewall portion 52 and the second sidewall portion 53 are in parallel with the Dr direction, while the principal surfaces of the third sidewall portion 54 and the fourth sidewall portion 55 are vertical to the Dr direction.

Bobbins 57, 58 are provided to outer portions of the principal surface of the first sidewall portion 52. The tracking coils 36, 37 are wound around these bobbins, respectively. In addition, bobbins 59, 60 are provided to outer portions of the principal surface of the second sidewall portion 53. The tracking coils 38, 39 are wound around these bobbins, respectively. In this embodiment, the bobbins 57 to 60 are placed in end portions which are outward of the objective lens 31 in the Dr direction. The reason for this is that when the OBL holder 21 is installed in the small optical pickup, the reflecting mirror needs to be placed immediately under the objective lens 31, and a space 70 (FIG. 5B) for securing the optical path for the reflecting mirror needs to be provided in an area extending downward from the middle of the first sidewall portion 52 or the second sidewall portion 53 of the OBL holder 21, so that no margin for containing parts such as the coils is available in this area.

The tracking coils 36 to 39 wound around the respective bobbins are made from a long thin conducting wire, such as an enameled wire. One end of the wire is tied around one of binding portions 61 which are formed by projecting parts of the third sidewall portion 54, and the other end of the wire is tied around one of the other binding portions 61 which are provided to the fourth sidewall portion 55. In this respect, the tracking coils 36 to 39 have a winding axis extending in the Dt direction, and are wound around the respective bobbins 57 to 60 to be each, as a whole, shaped like a square whose corners are rounded. In addition, the tracking coils 36 to 39 are driving coils for driving the OBL holder 21 due to their magnetic effects. This function is the case with the focus coils 29, 30, which will be described later, as well.

In this embodiment, the tracking coils 36, 37 provided to the first sidewall portion 52 are wound in parallel to the outer surface of the first sidewall portion 52 in a way that makes their winding axes vertical to the outer surfaces of the first sidewall portion 52. On the other hand, the tracking coils 38, 39 provided to the second sidewall portion 53 are placed tilting to the outer surface of the second sidewall portion 53. This matter will be described later by referring FIG. 6C.

Three binding portions 61 are placed on the third sidewall portion 54. The two ends of the enameled wire forming the focus coil 29 are respectively tied around two of the three binding portions 61. One end of the tracking coils 36 to 39 is tied around the remaining one of the three binding portions 61. Similarly, the other three binding portions 61 are provided to the fourth sidewall portion 55. The two ends of the enameled wire forming the focus coil 30 are respectively tied around two of the other three binding portions 61. The other end of the tracking coils 36 to 39 is tied around the remaining one of the other three binding portions 61. The support wires 45 shown in FIG. 2 are respectively connected to the enameled wires which are wound around these binding portions.

The focus coils 29, 30 are housed in the OBL holder 21. The focus coil 29 is placed in a housing area 22 which is provided to an end portion of the OBL holder 21 which is closer to the third sidewall portion 54, and the focus coil 30 is placed in a housing area 23 which is provided to an end portion of the OBL holder 21 which is closer to the fourth sidewall portion 55. Thereby, the focus coils 29, 30 are placed outward of the objective lens 31 in the Dr direction. The reason why the housing areas 22, 23 for housing the focus coils 29, 30 are provided in the end portions outward of the outer peripheral end portions of the objective lens 31 is the same as the reason why the bobbins 57 to 60 are placed in their respective end portions. In this respect, the size of the housing areas 22, 23 in the plan view is set equal to or slightly larger than the size of the focus coils 29, 30 which are housed in the housing areas 22, 23.

In addition, the focus coils 29, 30 have a winding axis extending in the Df direction, and are each made by winding an enameled wire in a way that makes each of the focus coils 29, 30 as a whole shaped like a square whose corners are rounded. In this respect, the tracking coils 36 to 39 are directly wound around the respective bobbins 57 to 60 which constitute parts of the OBL holder 21, whereas the focus coils 29, 30 are prepared in a state of being wound and are fixedly attached to the inside of the OBL holder 21 by use of an adhesive. Furthermore, although not illustrated, protrusions for the focus coils 29, to be housed in the respective predetermined locations are provided inside the OBL holder 21.

Referring to FIG. 5B, in the embodiment, a protrusion 27A formed by projecting a part of the side surface of the second sidewall portion 53 outward is provided near the bobbin 59 in order that the tracking coil wound around the bobbin 59 can tilt to the side surface of the second sidewall portion 53. The protrusion 27A is a part formed by partially projecting the outer side surface of the second sidewall portion 53 inward of the bobbin 59, and is shaped like a thin rectangle that is long in the Df direction. With the provision of the protrusion 27A, the tracking coil wound around the bobbin 59 comes in contact with the protrusion 27A. Thereby, the tracking coil is wound with its winding axis tilted from the vertical to the second sidewall portion 53 in a direction away from the protrusion 27A, so that the tracking coil is formed tilted to the second sidewall portion 53.

Similarly, a protrusion 27B is formed by partially projecting the side of the second sidewall portion 53 which is inward of the bobbin 60. The tracking coil wound around the bobbin 60 comes in contact with the protrusion 27B. Thereby, the tracking coil is wound with its winding axis tilted from the vertical to the second sidewall portion 53 in a direction away from the protrusion 27B, and is thus formed tilted to the second sidewall portion 53.

Figure 6A:
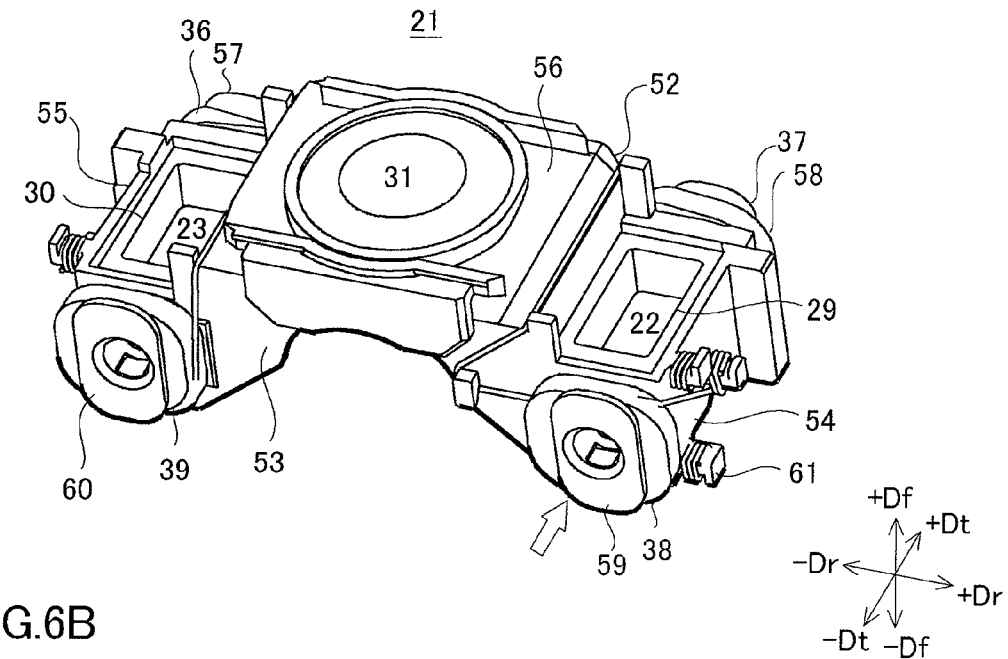
FIGS. 6A to 6C are diagrams showing a method of manufacturing the objective lens driving device of the preferred embodiment of the invention.
Figure 6B:
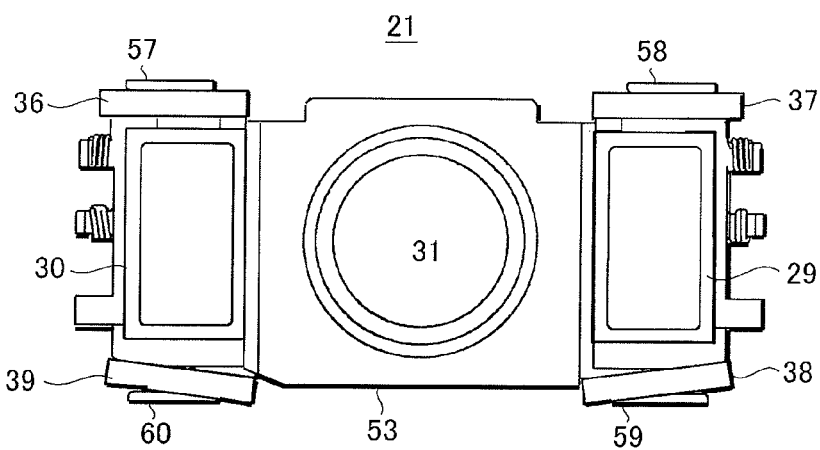
Figure 6C:
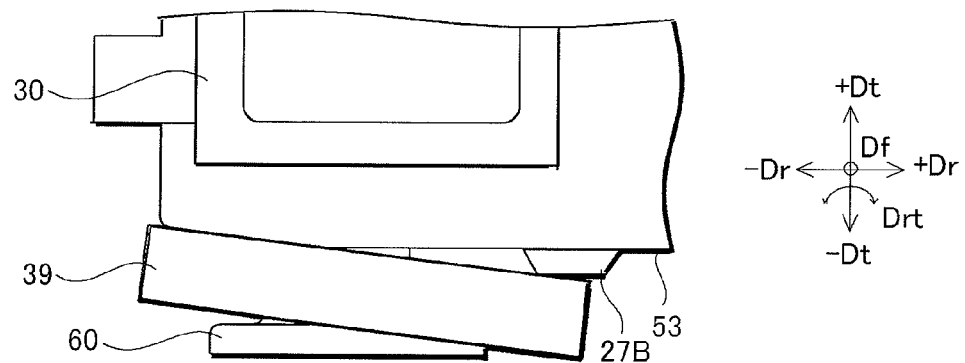
Figure 7A:
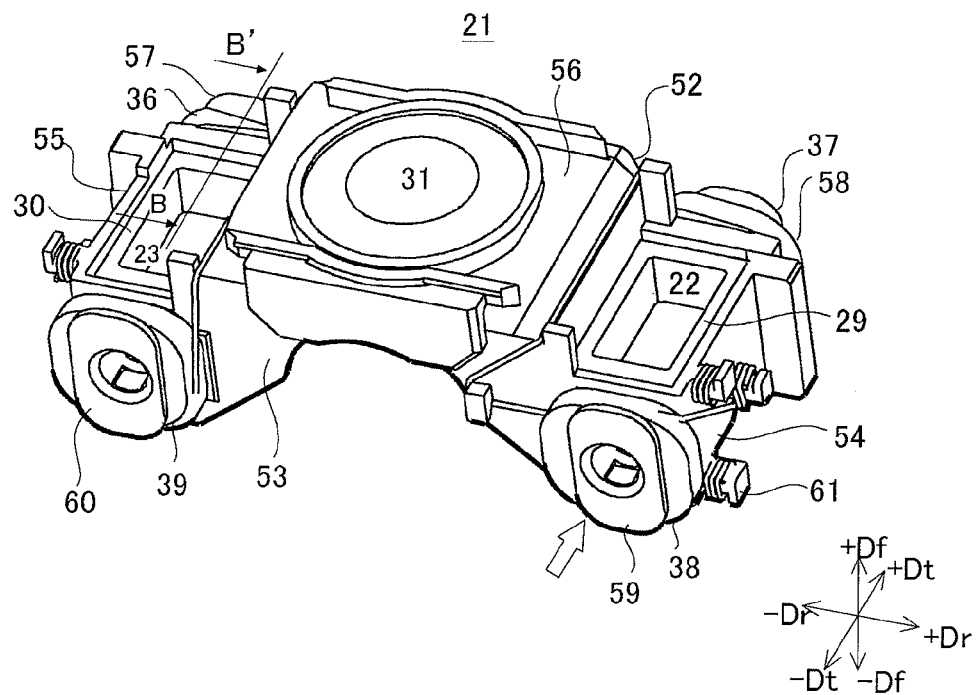
FIGS. 7A and 7B are the other diagrams showing the method of manufacturing the objective lens driving device of the preferred embodiment of the invention.
Figure 7B:
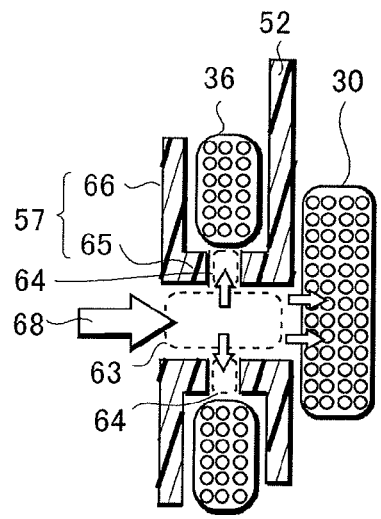

Next, referring to the above-mentioned drawings, FIGS. 6A, 6B and 6C as well as FIGS. 7A and 7B, descriptions will be provided for a method of manufacturing the objective lens driving device having the above-described constitution. FIG. 6A is a perspective view showing the OBL holder 21; FIG. 6B is a plan view showing the OBL holder 21 which is looked at from above; and FIG. 6C is a plan view showing a part of the tracking coil 39 in a magnified manner.

First of all, the OBL holder 21 having the shape as shown in FIG. 6A is prepared. The OBL holder 21 is formed by pouring a resin material, such as a liquid crystal polymer, into the cavity of a mold. The OBL holder 21 has the four sidewall portions, and the bobbins around which to wind the respective tracking coils are integrally provided to the first sidewall portion 52 and the second sidewall portion 53.

Subsequently, the tracking coils 36 to 39 are formed by winding an enameled wire around each of the bobbins 57 to 60. The tracking coils 36 to 39 are formed from one enameled wire, and the enameled wire is wound around the bobbins 59, 58, 57, 60 by an automated machine in this order. One end of the enameled wire forming the tracking coils 36 to 39 is tied around the one of the binding portions 61 provided to the third sidewall portion 54. In addition, the other end of the enameled wire is tied around the one of the other binding portions 61 provided to the fourth sidewall portion 55.

Afterward, the focus coils 29, 30 are housed in the OBL holder 21. To put it specifically, the focus coils 29, 30 are housed in the OBL holder 21 from the lower portion of the OBL holder 21 which has the respective openings. In this embodiment, the housing areas 22, 23 are provided to the two respective end portions of the OBL holder 21 in the Dr direction, and the focus coils 29, 30 are housed in the respective housing areas. Thereafter, the two ends of the enameled wire forming the focus coil 29 are respectively tied around the remaining binding portions 61 provided to the third sidewall portion 54. Furthermore, the two ends of the enameled wire forming the focus coil 30 are respectively tied around the remaining binding portions 61 provided to the fourth sidewall portion 55.

In addition, the objective lens 31 is fixed to a fixation portion 62, which is provided to the principal surface portion 56 of the OBL holder 21, by use of an insulating adhesive.

Referring to FIG. 6B, out of the tracking coils 36 to 39, the tracking coils 36, 37 are formed in parallel with the first sidewall portion 52 of the OBL holder 21. On the other hand, the tracking coils 38, 39 are placed tilting to the second sidewall portion 53 in the way that makes the inner portions of the tracking coils 38, 39 project further outwards than the outer portions of the tracking coils 38, 39 when viewed in the Df direction.

Referring to FIG. 6C, in the embodiment, the tracking coil 39 is placed tilting by placing the protrusion 27B in the vicinity of the bobbin 60.

As described by referring to FIG. 5B, the protrusion 27B is the one which is obtained by projecting the part of the second sidewall portion 53 in the vicinity of the bobbin 60. The side surface of the protrusion 27B forms a slope which becomes gradually wider toward the second sidewall portion 53 for the purpose of preventing the enameled wire forming the tracking coil 39 from being tangled with the protrusion 27B.

When the enameled wire is wound around the bobbin 60, the enameled wire being wound gets into contact with the protrusion 27B. Accordingly, the tracking coil 39 is wound to be pushed out in the −Dt direction. As a result, corresponding to the thickness of the protrusion 27B, the contact portion of the tracking coil 39 is formed while being moved in the −Dt direction, and thereby the tracking coil 39 is formed tilting.

Referring to FIG. 6B, for the tracking coil 38, the protrusion 27A shown in FIG. 5B is provided in the vicinity of the bobbin 59, as in the case of the tracking coil 39. Accordingly, the contact of the enameled wire forming the tracking coil 38 with the protrusion 27A makes the tracking coil 38 placed tilting to the second sidewall portion 53.

Next, referring to FIGS. 7A and 7B, an adhesive is supplied in order to fixedly attaching the focus coil 30 to the OBL holder. FIG. 7A is a perspective view of the OBL holder 21 used to show this step, and FIG. 7B is a cross-sectional view of the OBL holder 21 taken along the B-B' line of FIG. 7A.

Referring to FIG. 7B, the bobbin 57 around which to wind the tracking coil 36 includes: a cylindrical portion 65 projecting outwards from the first sidewall portion 52, and shaped like a cylinder; and a flange portion 66 formed by expanding the outer end portion of the cylindrical portion 65. A communicating hole 63 which makes the holder communicate with the outside is formed inside the cylindrical portion 65. In addition, through-holes 64 are provided, each penetrating a part of the cylindrical portion 65. This constitution is the same in the other bobbins.

In this step, a fluid adhesive is supplied to the communicating hole 63. The adhesive 68 supplied to the communicating hole 63 is impregnated into interstices among parts of the conducting wire constituting the focus coil 30. In addition, part of the adhesive 68 enters the interstice between the inner wall of the first sidewall portion 52 and the focus coil 30. Similarly, the adhesive is supplied to the focus coil 30 through the bobbin 60 (see FIG. 7A) provided to the second sidewall portion 53. Furthermore, the adhesive is supplied to the focus coil 29 through the bobbins 58, 59 (see FIG. 7A) as well.

Part of the adhesive supplied to the communicating hole 63 is supplied to the tracking coil as well. To put it specifically, the supplied adhesive 68 enters the space surrounded by the flange portion 66 and the first sidewall portion 52 via the through-holes 64. Thereby, the adhesive having entered the space is impregnated into the interstices among parts of the conducting wire constituting the tracking coil 36. The method of supplying the adhesive 68 to the tracking coil 36 is the same as the method of supplying the adhesive to the tracking coil in each of the other bobbins.

After that, the tracking coils 36 to 39 and the focus coils 29, 30 are solidified and fixedly attached by hardening the adhesives.

The OBL holder 21 whose constitution is shown in FIGS. 5A and 5B is manufactured through the above-described steps. In addition, referring to FIG. 2, the objective lens driving device 50 is manufactured by fixing the OBL holder 21 to the actuator frame 41 through a step of attaching the support wires 45. Furthermore, referring to FIG. 1, the optical pickup apparatus 100 is manufactured by installing the objective lens driving device 50 having this constitution, together with the other optical elements, into the housing 51.

According to the preferred embodiment of the invention, at least some of the tracking coils are placed tilting to the one of the sidewall portions of the objective lens holder. For this reason, the thus-placed tracking coils get closer to the respective magnets, and the effective magnetic fluxes of the magnets which act on the tracking coils are strengthened.

Furthermore, in the embodiment, the sub-yokes are formed by bending the side end portions of the back yoke, and the other magnets are surrounded by the back yoke and the sub-yokes. Thereby, the effective magnetic fluxes of the magnets can be further strengthened.

What is claimed is:

1. An objective lens driving device comprising:
an objective lens holder for holding an objective lens;

a first tracking coil and a second tracking coil placed on an outer side of a first sidewall portion of the objective lens holder;

a third tracking coil and a fourth tracking coil placed on an outer side of a second sidewall portion of the objective lens holder, the second sidewall portion being opposed to the first sidewall portion;

an actuator frame for movably supporting the objective lens holder; and a first magnet, a second magnet, a third magnet and a fourth magnet fixed to the actuator frame in order to produce effective magnetic fluxes over effective areas of the first tracking coil, the second tracking coil, the third tracking coil and the fourth tracking coil, respectively, wherein the first tracking coil, the second tracking coil, the third tracking coil and the fourth tracking coil are formed by winding a conducting wire around a first bobbin, a second bobbin, a third bobbin and a fourth bobbin, respectively, the first and second bobbins being sideways projecting parts of the first sidewall portion and the third and fourth bobbins being sideways projecting parts of the second sidewall portion, the first tracking coil and the second tracking coil are tilted to the first sidewall portion, a first protrusion and a second protrusion are provided as projecting parts of the first sidewall portion near the first bobbin and the second bobbin, respectively, and the first tracking coil and the second tracking coil are tilted to the first sidewall portion in such a way that parts of the conducting wires forming the first tracking coil and the second tracking coil are in contact with the first protrusion and the second protrusion, respectively.

2. The objective lens driving device according to claim 1, further comprising focus coils which are housed inside the objective lens holder.

3. The objective lens driving device according to claim 1, wherein
the objective lens holder is supported by support wires to be movable relative to the actuator frame, and
the support wires are laid over sides of the first magnet and the second magnet, respectively.

4. The objective lens driving device according to claim 1, further comprising a cover made from a magnetic material and covering the actuator frame from above.

5. An optical pickup apparatus comprising the objective lens driving device according to claim 1 which is installed in a housing.

* * * * *